Nov. 29, 1960  F. L. GORE  2,962,315
MULTIPLE LOCKING MECHANISM
Filed Nov. 15, 1957  2 Sheets-Sheet 2
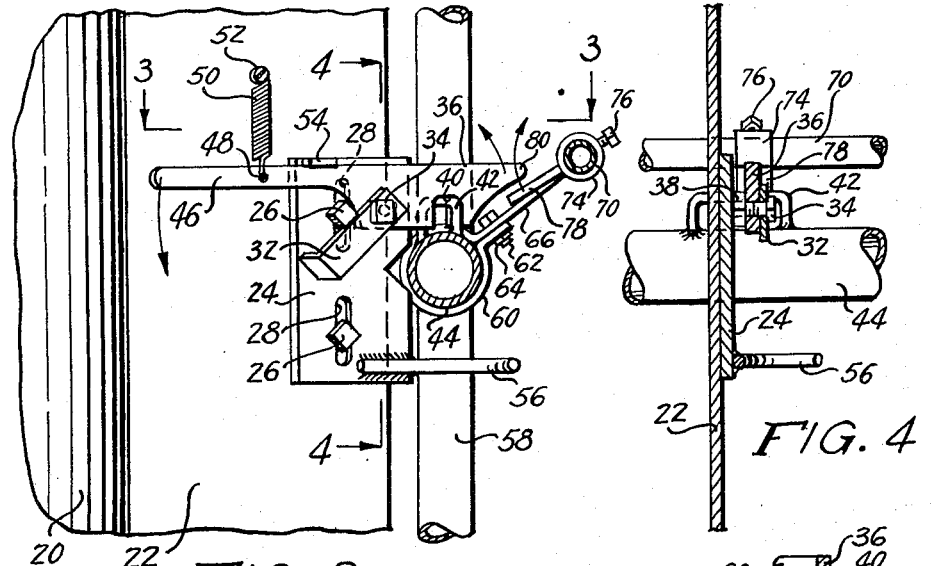
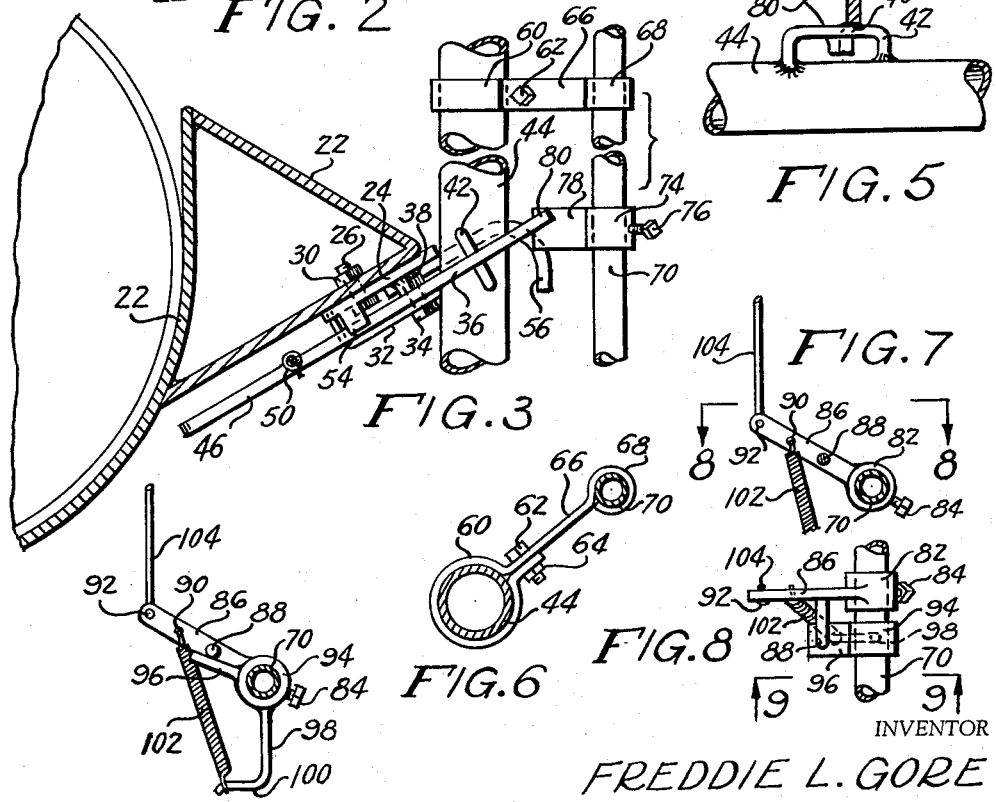
INVENTOR
FREDDIE L. GORE
BY Gustave Miller
ATTORNEY

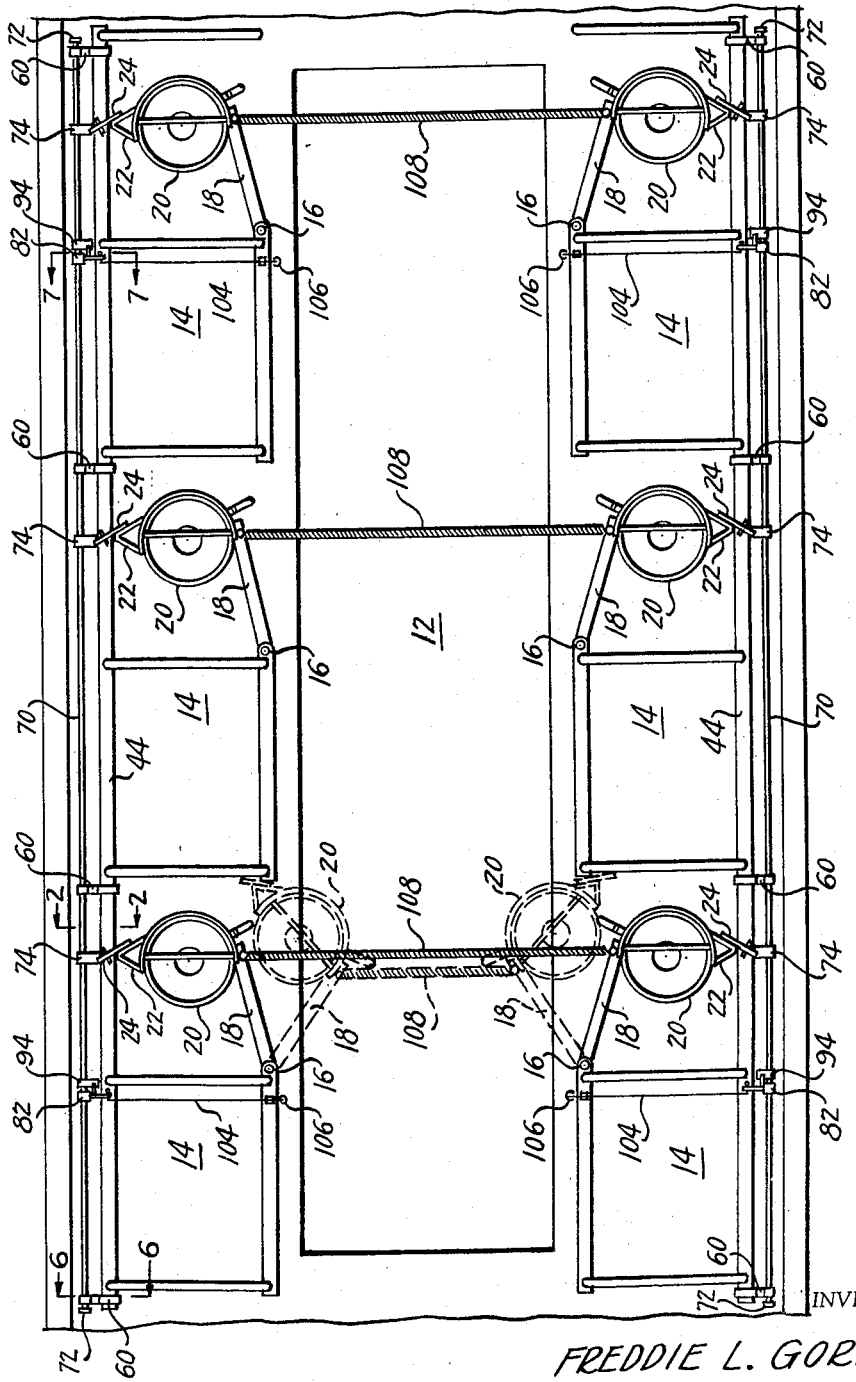

United States Patent Office 2,962,315
Patented Nov. 29, 1960

2,962,315

MULTIPLE LOCKING MECHANISM

Freddie Lee Gore, P.O. Box 605, Zephyrhills, Fla.

Filed Nov. 15, 1957, Ser. No. 696,827

3 Claims. (Cl. 292—28)

This invention relates to a semi-automatic, multiple release locking means, and it particularly relates to a locking means of this type adapted for use on walk-through milking parlor stalls.

Heretofore, it was generally necessary for each stall to be locked and unlocked separately. This required much waste of time. For example, a good milking speed for two men was heretofore considered to be forty-five cows per hour; using three milking machines and six parlor stalls. By using the locking means of the present invention, one man, using the same three milking machines in six parlor stalls, can milk fifty-four cows an hour. Furthermore, whereas, heretofore, much energy was wasted in going from one stall to the next both to lock and unlock the stalls, by means of this invention, one man can either lock or unlock all the stalls simultaneously with hardly any walking or other wasted effort.

It is, therefore, one object of the present invention to provide a locking means for walk-through milking parlor stalls which is effectively operated by a single operator.

Another object of the present invention is to provide a locking means of the above type which is easily and simply operated with little waste of effort.

Another object of the present invention is to provide for simultaneous locking and unlocking of the above type of locking means in regard to a plurality of stalls.

Other objects of the present invention are to provide an improved locking means, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a top plan view of a six stall walk-through type parlor in which locking means embodying the present have been installed.

Fig. 2 is a view, partly in section and partly in elevation, taken on line 2—2 of Fig. 1.

Fig. 3 is a view, partly in section and partly in elevation, taken on line 3—3 of Fig. 2.

Fig. 4 is a view, partly in section and partly in elevation, taken on line 4—4 of Fig. 2.

Fig. 5 is a fragmentary, detailed view, partly in section and partly in elevation, showing the coaction of the catch and the latch means.

Fig. 6 is a view, partly in section and partly in elevation, taken on line 6—6 of Fig. 1.

Fig. 7 is a view, partly in section and partly in elevation, taken on line 7—7 of Fig. 1.

Fig. 8 is a view taken on line 8—8 of Fig. 7.

Fig. 9 is a view taken on line 9—9 of Fig. 8.

Referring now in greater detail to the drawings wherein similar reference characters refer to similar parts, there is shown a milking parlor, generally designated 10, comprising a central pit 12 bounded on each side by a series of stalls 14, three such stalls being provided at each side in the parlor illustrated.

Pivotally connected, as at 16, to the side rails of each stall 14 is a gate 18 which is provided, at its free end, with a connection to a vertical, generally cylindrical feed trough 20. With the pivoted gate 18 in its inner position, as shown in Fig. 1, in full outline, the cow is prevented from further forward movement by the trough 20 which acts not only as a feed trough but as a barrier. With the gate in its dotted outline position, as shown in Fig. 1, the feed trough 20 is removed as a barrier so that the cow may continue its forward movement. As illustrated, the stalls 14 are defined by veritcal, horizontal and transverse overhead rails in the common manner whereby each stall is defined by an open framework.

Each feed trough 20 is provided with a generally triangular vertical extension 22 along one side. Mounted on the outer side of this extension 22 is a plate 24. This plate 24 is releasably and adjustably retained on the side of extension 22 by bolts 26 passing through corresponding, vertically-elongated slots 28 in the plate 24 as well as through mating openings in the wall of the extension 22. A nut 30 holds each bolt 26 in adjusted position.

Connected to each plate 24 is a generally L-shaped pivot support arm 32 which extends in an upwardly inclined direction, as best shown in Fig. 2. The arm 32 is connected to the plate 24 by its lateral portion of minor length while its major portion of longitudinal length extends in the aforementioned upwardly-inclined direction in spaced relationship to the plate 24. At its upper or free end, the major portion of the arm 32 is provided with an opening through which extends a pivot bolt 34. The bolt 34 also passes through a corresponding opening in a latch member 36 which is pivotally held on the bolt by a nut 38.

The latch member 36 is provided on its underside with a recess 40 adapted to lockingly receive a catch 42. The catch 42 comprises a generally U-shaped member secured, as by welding or other suitable means, to the longitudinal bar 44 forming one of the rails defining the outer side of the stalls.

The latch member 36 is also provided with a finger 46 having a hole 48 to which is connected one end of a coil spring 50. The other end of spring 50 is attached to the wall of extension 22 by a screw 52 or the like. The spring 50 acts to pull up on the finger 46 thereby biasing the recess 40 of the latch member 36 into engagement with the catch 42. Pivotal movement of the latch member is, however, limited by a stop 54 which extends laterally from the top of plate 24 and overlies the latch member 36, as shown in Figs. 2 and 3.

When the latch member is in its normally-closed locking position, as in Fig. 2, a hook 56 (best shown in Fig. 3) engages the adjacent vertical bar 58 (as best shown in Fig. 2) to hold the feed trough secure in position. This hook 56 is disengaged automatically from the bar 58 when the feed trough 20 is swung away from its closed position and is automatically re-engaged with bar 58 when the feed trough moves back to its closed position and is latched in place.

Positioned at intervals along the length of each longitudinal bar 44 are a plurality of collars 60. These collars 60 clampingly engage the bar 44 and are held in such clamped position by bolts 62 and nuts 64 (best shown in Fig. 6). An arm 66 extends laterally from each collar 60, and, at their outer ends, the arms 66 are each provided with a bearing portion 68. These bearing portions 68 support a rotatable release rod 70 in spaced, parallel relation to bar 44. The rod 70 is retained against longitudinal movement in the bearing portions 68 by stop collars 72, one such stop collar 72 being provided at each end of each rod 70. These stop collars 72 are adapted to bear against the adjacent bearing portion 68 to prevent longitudinal movement of the rod 70.

The release rod 70 is provided at spaced intervals with collars 74 releasably secured to the rod 70 by setscrews 76. Each collar 74 is provided with a release tab 78. There are three collars 74 having release tabs 78, on each rod 70, one release tab corresponding to each feed trough. The collars 74 are so positioned on the rod 70 that a release tab 78 underlies the undercut lip 80 at the forward end of the corresponding latch mmeber 36, when the latch members 36 are in locked position (as illustrated in Fig. 2).

The rod 70 is rotatably biased into a position wherein the release tabs 78 underlie the lips 80 of the corresponding latch members 36 (in the manner shown in Fig. 2) by the means illustrated in Figs. 7, 8 and 9. This means comprises one or more collars 82 fixed to the rod 70 by set-screws 84 and having a lever 86 extending therefrom. Each lever 86 is provided with a lateral finger 88 at its inner end, a spring connection 90 at its center, and a cable connection 92 at its outer end. Adjacent each collar 82 is a bearing member 94 similar to bearing portions 68. The bearing members 94 are each provided with an arm 96 for connecting the bearing member 94 to bar 44 in similar manner to bearing portions 68, and are also provided with a depending arm 98 having a lateral extension 100 at its lower end. A coil spring 102 is connected, at one end, to connection 90 on lever 86 and, at the other end, to lateral extension 100 (as best shown in Fig. 9). In this manner the springs 102 act to resiliently bias the rod 70 into its position shown in Fig. 2. The finger 88 acts as a limit stop by its abutment against arm 96.

In order to rotate the rod 70 against its bias, there is provided a cable 104 connected to each lever 86 by connection 92. This cable 104 runs over appropriate pulleys and is provided with a handle 106 adjacent the pit 12. By pulling down on a handle 106, the cable 104 lifts the lever 86 which rotates the rod 70 against the force of springs 102. This pivots release tabs 78 to push up under lips 80 to release the latch members 36 from catch members 42. Coil springs 108 connect the corresponding feed troughs 20 in the two rows of stalls (as best shown in Fig. 1), these springs acting to urge the troughs 20 toward each other into the dotted outline position. Therefore, when the latch mechanism is released, the springs 108 automatically act to open the stalls.

When the handle 106 is released, the rod 70 rotates, under the urging of springs 102, back to the position wherein the tabs 78 are adapted to underlie the latch 36. The troughs 20 can then be moved back into the closed positions shown in full line in Fig. 1. As soon as they are moved back into these positions, the latch member 36, under the force of spring 50, will automatically move into the position of Fig. 2 wherein the recess 40 is in engagement with catch 42.

If desired, the individual latch mechanisms may be separately locked and unlocked by manually manipulating the individual latch member 36.

The number of stalls has been illustrated as being six in number, three on each side of the pit 12. However, the number of stalls may vary as desired since the operation of the locking means would remain substantially the same. Similarly, although a release cable 104 and handle 106 is shown at each end of each row, only one such release means may be provided or, on the other hand, there may be as many as desired.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A multiple locking mechanism for a plurality of milking parlor stalls, each of said stalls having a feed trough gate closure pivotally connected to a stall, said locking mechanism comprising an individual pivoted latch member on each said trough gate closure, a catch on each said stall adapted to be engaged by its said latch member, a spring connecting each said latch member to its said stall urging said latch member into engagement with said catch, a rotatable rod connected to each said stall, a plurality of release tabs connected to said rod for rotation therewith, spring means carried by said rod urging said rod into a position wherein each said tab underlies a different one of said latch members out of engagement therewith, and cable means to rotate said rod to move each said tab against its said latch member and lift it out of engagement with its said catch.

2. A multiple locking means for a plurality of parlor stalls each having a movable closure, said locking means comprising an individual latch member pivotally connected to each said closure, each said latch member having a recess, a fixed catch in the path of each said latch member and adapted to be engaged with said recess, means connecting each said latch member to said stall resiliently urging each said latch member into the position wherein its recess engages its said catch, a rotatable rod adjacent said catch, a release tab for each said latch on said rod, means carried by said rod resiliently urging said rod into a rotatable position wherein each said tab is spaced from its said latch member, and cable means to rotate said rod to move each said tab into engagement with its said latch member and to move each said latch member out of engagement with its said catch.

3. The locking means of claim 2, and a common means for resiliently urging pairs of said closures into the open position wherein said locking means is released.

References Cited in the file of this patent

UNITED STATES PATENTS

| | | |
|---|---|---|
| 482,462 | Slawson | Sept. 13, 1892 |
| 952,715 | Shonka | Mar. 22, 1910 |
| 986,084 | Petrovics | Mar. 7, 1911 |
| 1,126,728 | Dillabough | Feb. 2, 1915 |
| 2,023,774 | Sterling | Dec. 10, 1935 |
| 2,068,888 | Patten | Jan. 26, 1937 |
| 2,269,012 | De Carli | Jan. 6, 1942 |
| 2,463,392 | Kennel | Mar. 1, 1949 |
| 2,660,765 | Carlson | Dec. 1, 1953 |
| 2,726,635 | Ferris | Dec. 13, 1955 |